US011906336B2

(12) United States Patent
Valtierra et al.

(10) Patent No.: US 11,906,336 B2
(45) Date of Patent: Feb. 20, 2024

(54) PUMPJACK PRODUCTION WELL INCLUDING VENTURI FLUID SENSOR AND CAPACITIVE FLOW SENSOR

(71) Applicant: Hydroacoustics Inc., Henrietta, NY (US)

(72) Inventors: Robert D. Valtierra, Barrington, RI (US); Mark J. Ozimek, Pittsford, NY (US); Eugene Sisto, Rochester, NY (US); John H. Benton, Littleton, CO (US); Ricardo P. Quintanilla, Irondequoit, NY (US)

(73) Assignee: Hydroacoustics Inc., Henrietta, NY (US)

( * ) Notice: Subject to any disclaimer, the term of this patent is extended or adjusted under 35 U.S.C. 154(b) by 83 days.

(21) Appl. No.: 17/826,715

(22) Filed: May 27, 2022

(65) Prior Publication Data
US 2022/0364893 A1    Nov. 17, 2022

Related U.S. Application Data

(63) Continuation-in-part of application No. 16/270,020, filed on Feb. 7, 2019, now Pat. No. 11,346,186, which is a continuation-in-part of application No. 16/263,136, filed on Jan. 31, 2019, now Pat. No. 10,704,938.
(Continued)

(51) Int. Cl.
*G01F 1/44*   (2006.01)
*G01N 27/22*  (2006.01)
*F04B 47/02*  (2006.01)
*E21B 47/00*  (2012.01)

(52) U.S. Cl.
CPC ............... *G01F 1/44* (2013.01); *E21B 47/00* (2013.01); *F04B 47/02* (2013.01); *G01N 27/22* (2013.01)

(58) Field of Classification Search
CPC . G01F 1/44; F04B 47/02; G01N 27/22; E21B 47/00
See application file for complete search history.

(56) References Cited

U.S. PATENT DOCUMENTS 4,509,371 A * 4/1985 Wellman .................. F24F 11/74
                                                            73/1.26
4,523,644 A   6/1985 Dismukes
(Continued)

FOREIGN PATENT DOCUMENTS

| CN | 1406311 | 3/2003 |
|---|---|---|
| CN | 202810790 | 3/2013 |

(Continued)

OTHER PUBLICATIONS

International Search Report With Written Opinion for PCT/US19/17014 dated May 1, 2019.
(Continued)

*Primary Examiner* — Yong-Suk (Philip) Ro
(74) *Attorney, Agent, or Firm* — Duane C. Basch; Dawson Law Firm, PC

(57) ABSTRACT

A fluid sensor, and associated monitoring and control system, employing a cylindrical venturi to eliminate stratification of fluid passing therethrough, and a capacitive sensor operatively coupled with the cylindrical venturi to facilitate the sensing of the fluid while in the venturi.

18 Claims, 11 Drawing Sheets

Related U.S. Application Data

(60) Provisional application No. 63/312,914, filed on Feb. 23, 2022, provisional application No. 62/659,825, filed on Apr. 19, 2018, provisional application No. 62/627,310, filed on Feb. 7, 2018, provisional application No. 62/624,171, filed on Jan. 31, 2018.

(56) References Cited

U.S. PATENT DOCUMENTS

| | | | |
|---|---|---|---|
| 4,577,691 A | 3/1986 | Huang et al. | |
| 5,113,966 A | 5/1992 | Gregory et al. | |
| 5,604,441 A * | 2/1997 | Freese, V | G01N 33/2888 |
| | | | 324/663 |
| 5,672,832 A | 9/1997 | Cucci et al. | |
| 5,880,378 A * | 3/1999 | Behring | G01F 1/44 |
| | | | 73/861.53 |
| 5,955,666 A | 9/1999 | Mullins | |
| 6,755,086 B2 | 6/2004 | Salamitou et al. | |
| 8,113,278 B2 | 2/2012 | DeLaCroix et al. | |
| 11,346,186 B2 | 5/2022 | Valtierra et al. | |
| 2004/0149436 A1 | 8/2004 | Sheldon | |
| 2004/0182172 A1 | 9/2004 | Richards | |
| 2006/0162466 A1 | 7/2006 | Wargo et al. | |
| 2006/0180386 A1 | 8/2006 | Birchak et al. | |
| 2009/0065197 A1 | 3/2009 | Eslinger | |
| 2009/0139347 A1 | 6/2009 | Speldrich | |
| 2009/0200019 A1 | 8/2009 | DeLaCroix et al. | |
| 2010/0121257 A1 | 5/2010 | King | |
| 2010/0290313 A1 | 11/2010 | Groves | |
| 2011/0259120 A1 | 10/2011 | Thonstad | |
| 2011/0301899 A1 * | 12/2011 | David | G01F 1/74 |
| | | | 702/100 |
| 2012/0279292 A1 * | 11/2012 | Simonian | E21B 47/06 |
| | | | 73/152.51 |
| 2014/0197704 A1 | 7/2014 | Knapp et al. | |
| 2014/0216727 A1 | 8/2014 | Kasyanov et al. | |
| 2014/0305877 A1 | 10/2014 | Cioanta et al. | |
| 2015/0075867 A1 | 3/2015 | Eddison et al. | |
| 2016/0010451 A1 * | 1/2016 | Melo | E21B 47/10 |
| | | | 73/1.16 |
| 2016/0076925 A1 * | 3/2016 | Chen | G01F 1/74 |
| | | | 702/49 |
| 2016/0115753 A1 | 4/2016 | Frazier et al. | |
| 2016/0146963 A1 | 5/2016 | Hall et al. | |
| 2018/0120137 A1 * | 5/2018 | Jones | G01F 1/44 |
| 2019/0063216 A1 * | 2/2019 | Bouldin | E21B 47/10 |
| 2019/0234777 A1 | 8/2019 | Valtierra et al. | |
| 2020/0263531 A1 | 8/2020 | Fyfe et al. | |

FOREIGN PATENT DOCUMENTS

| | | |
|---|---|---|
| CN | 105607553 | 5/2016 |
| EA | 200602209 | 4/2007 |
| EP | 2780858 | 3/2014 |
| WO | WO2017096078 | 6/2017 |
| WO | WO2017218439 | 12/2017 |

OTHER PUBLICATIONS

International Search Report With Written Opinion for PCT/US19/15960 dated May 23, 2019.

European Office Action for European Patent Application No. 19751116.5 dated Oct. 19, 2021 Oct. 19, 2021.

Extended European Search Report for European Application No. 19751116.5 dated Sep. 29, 2021 Sep. 29, 2021.

English Translation Chinese Patent CN14036311, 9 pages. Apr. 13, 2022.

English Google Translation Chinese Patent CN1056027553A, 5 pages. Apr. 13, 2022.

English Google Translation Chinese Patent CN202810790, 3 pages. Apr. 17, 2022.

English Google Translation Russian Patent EA200602209, 3 pages. Apr. 17, 2022.

International Search Report With Written Opinion for PCT/US2023/013476 dated Jun. 28, 2023.

\* cited by examiner

PUMPJACK PRODUCTION WELL INCLUDING VENTURI FLUID SENSOR AND CAPACITIVE FLOW SENSOR

This application claims priority under 35 U.S.C. § 119(e) to U.S. Provisional Patent Application 63/312,914 for a PUMPJACK PRODUCTION WELL INCLUDING VENTURI FLUID SENSOR AND CAPACITIVE FLOW SENSOR, filed Feb. 23, 2022 by Robert D. Valtierra et al.; and this application further claims priority as a continuation-in-part of co-pending U.S. patent application Ser. No. 16/270,020 for an OIL RECOVERY TOOL AND SYSTEM filed Feb. 7, 2019 by R. Valtierra et al., which claims priority under 35 U.S.C. § 119(e) to the following provisional patent applications by Applicant Hydroacoustics, Inc., U.S. Provisional Application No. 62/627,310 for an OIL RECOVERY TOOL by R. Valtierra et al., filed Feb. 7, 2018; and U.S. Provisional Application No. 62/659,825 for an OIL RECOVERY TOOL by R. Valtierra, filed Apr. 19, 2018; and which also claims priority under 35 U.S.C. § 120 as a continuation-in-part of U.S. patent application Ser. No. 16/263,136 (U.S. Pat. No. 10,704,938) for a FLUID SENSOR AND PUMPJACK CONTROL SYSTEM by R. Valtierra et al., filed Jan. 31, 2019, which also claims priority from U.S. Provisional Application No. 62/624,171 for a FLUID SENSOR AND PUMPJACK CONTROL SYSTEM by R. Valtierra et al., filed Jan. 31, 2018; each of the above-identified applications and patents being hereby incorporated by reference in their entirety.

Disclosed is a device that employs a cylindrical venturi and a capacitive sensor to provide accurate characterization of both the flow rate of fluid (pressure differential) through the sensor along with the dielectric properties of the fluid to enable a characterization of the fluid as water or oil (or mixture thereof, or gas).

BACKGROUND AND SUMMARY

Conventional fluid flow sensors often are used to sense the flow of a liquid. However, such sensors are generally designed to operate with a particular type of fluid and are not always suitable for monitoring the flow of unknown fluids or mixtures (e.g., oil and water). Conventional sensors are intended for relatively steady state operation and may not be suitable for the dynamic flow produced by a pumpjack, where the flow comes in slugs. One aspect of the venturi design was intentionally avoiding issues associated with sensors that rely on a spinning wheel or rotor to detect flow, while avoiding the cost of acoustic or magnetic sensors. Moreover, capacitive sensors are known to monitor the dielectric properties of the material between the sensors, thereby allowing for the characterization of the flowing fluid.

While fluid sensor technology may be known, there remains a need for a sensor suitable for detecting both a fluid flow rate and the dielectric properties of the flowing fluid. The dielectric properties can be employed to characterize the type of fluid, so that in combination it may be possible to determine the flow rates of different fluids that may pass through the sensor.

The use of a three-dimensional sensor provides advantages over 2-dimensional sensors. These advantages include, although are not limited to:

a. The coaxial cylinders used for the sensor are commercially available purchased parts that are coated. The availability of commercial parts simplifies construction of the sensor compared to the 2-dimensional sensor plates that had to be custom-made;

b. The material used to separate the coaxial cylindrical cylinders is not 3D printed, which will allow for the possibility of refurbishing and re-using the cylinders as the coating wears out;

c. The use of coaxial cylinders for the sensor improves the ability to fully encapsulate and mix the fluids flowing through the sensor, thereby improving the sensing capability and sensor accuracy; and, d. The coaxial cylinders used for the sensing portion of the sensor are separated from the electrical components and connectorized. This construction method allows for easy replacement and maintenance of the sensor portion.

In one application contemplated for the disclosed embodiments, the fluid sensor may be used in a pumpjack production well, where oil, water, and/or gas are present and may be extracted. The sensor is potentially able to detect each of three possible phases of the well's production, and to totalize the amount of water and oil produced from the well. And, the specific combination of components disclosed herein also allows for compaction and miniaturization, where an existing well may lack space for a long compound assembly to sense fluid flow and pressure.

Disclosed in embodiments herein is a fluid sensor comprising: a cylindrical venturi including a pair of coaxial cylinders and having a gap between an outer surface of a first coaxial cylinder and an inner surface of a second coaxial cylinder, the cylindrical venturi producing a controlled thickness of non-stratified fluid flow through the gap; a first fluid pressure sensor located on an inlet to the cylindrical venturi; a second fluid pressure sensor located just before an outlet of the venturi; a capacitive sensor that is integral to the cylindrical venturi, the capacitive sensor including a pair of conductive coaxial cylindrical metal surfaces, one located on the outer surface of the first coaxial cylinder and the other located on the inner surface of the second coaxial cylinder, for detecting the dielectric properties of the fluid flowing through the venturi.

Further disclosed in embodiments herein is a pumpjack monitoring and control system, including: an in-line fluid sensor, operatively coupled to receive the fluid output of a pumpjack connected to a wellhead, and to generate pressure and capacitance signals in response to the fluid output, said fluid sensor comprising: a) a cylindrical venturi including first and second coaxial cylinders, wherein the first coaxial cylinder is located within the second coaxial cylinder, said coaxial cylinders forming a continuous, consistent, and uniform gap between an outer surface of the first coaxial cylinder and an inner surface of the second coaxial cylinder, the cylindrical venturi causing a controlled thickness of non-stratified fluid flow through the gap; b) a first fluid pressure sensor located on an inlet to the cylindrical venturi; c) a second fluid pressure sensor located upstream of an outlet of the cylindrical venturi; d) a capacitive sensor operatively associated with the cylindrical venturi, the capacitive sensor including a pair of conductive surfaces located on opposing sides of the gap in the cylindrical venturi; and a controller, operating in accordance with a set of pre-programmed instructions, said controller receiving output from said fluid sensor, said controller processing the output and using said output to monitor the pumpjack output and to report the performance of the pumpjack, and totalize the amount and types of liquids pumped from the wellhead.

Figure 1:
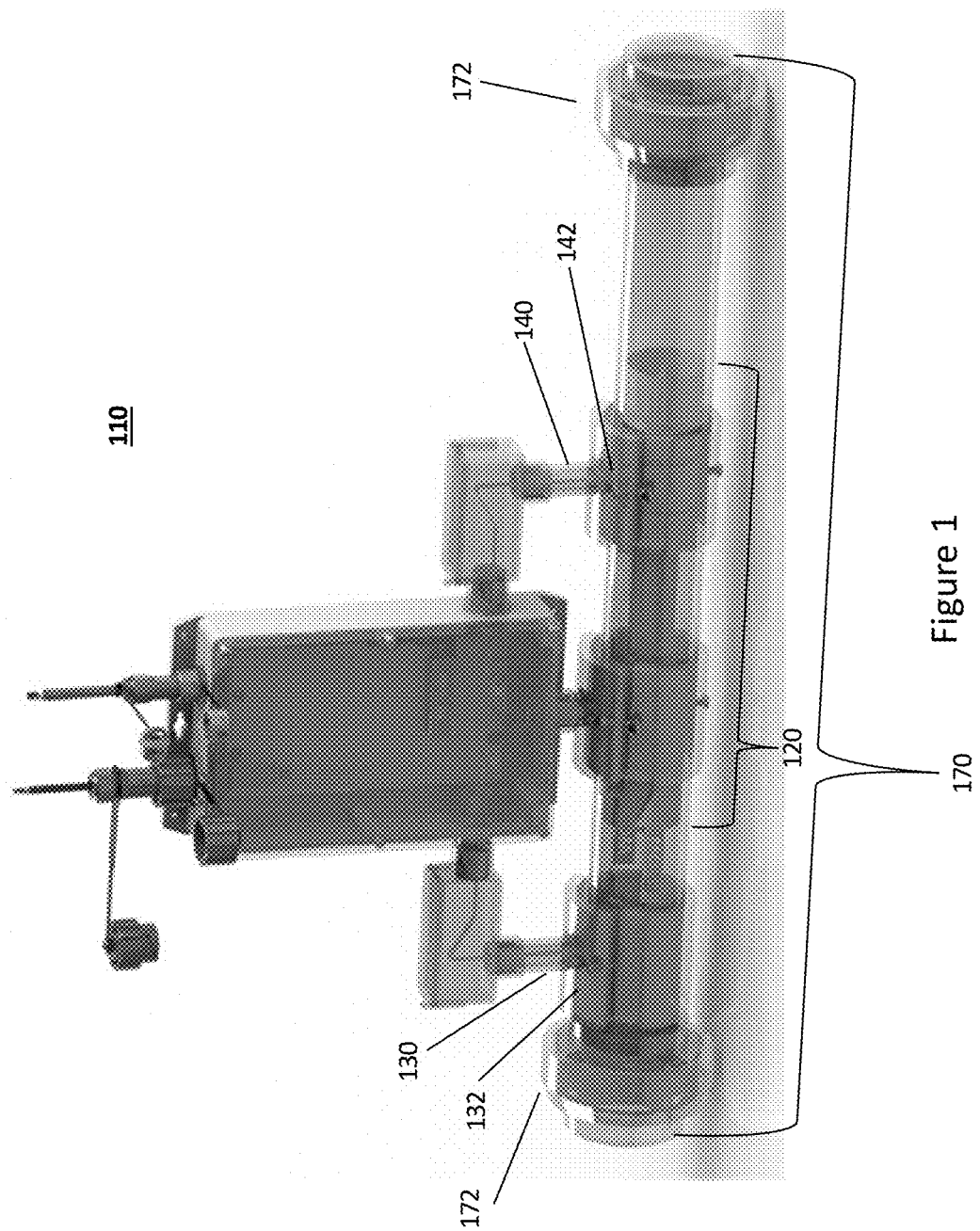
FIG. 1 is a perspective view of an embodiment of the fluid sensor incorporated within a plumbing fixture and including signal conditioner circuitry and a housing.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

Figure 2:
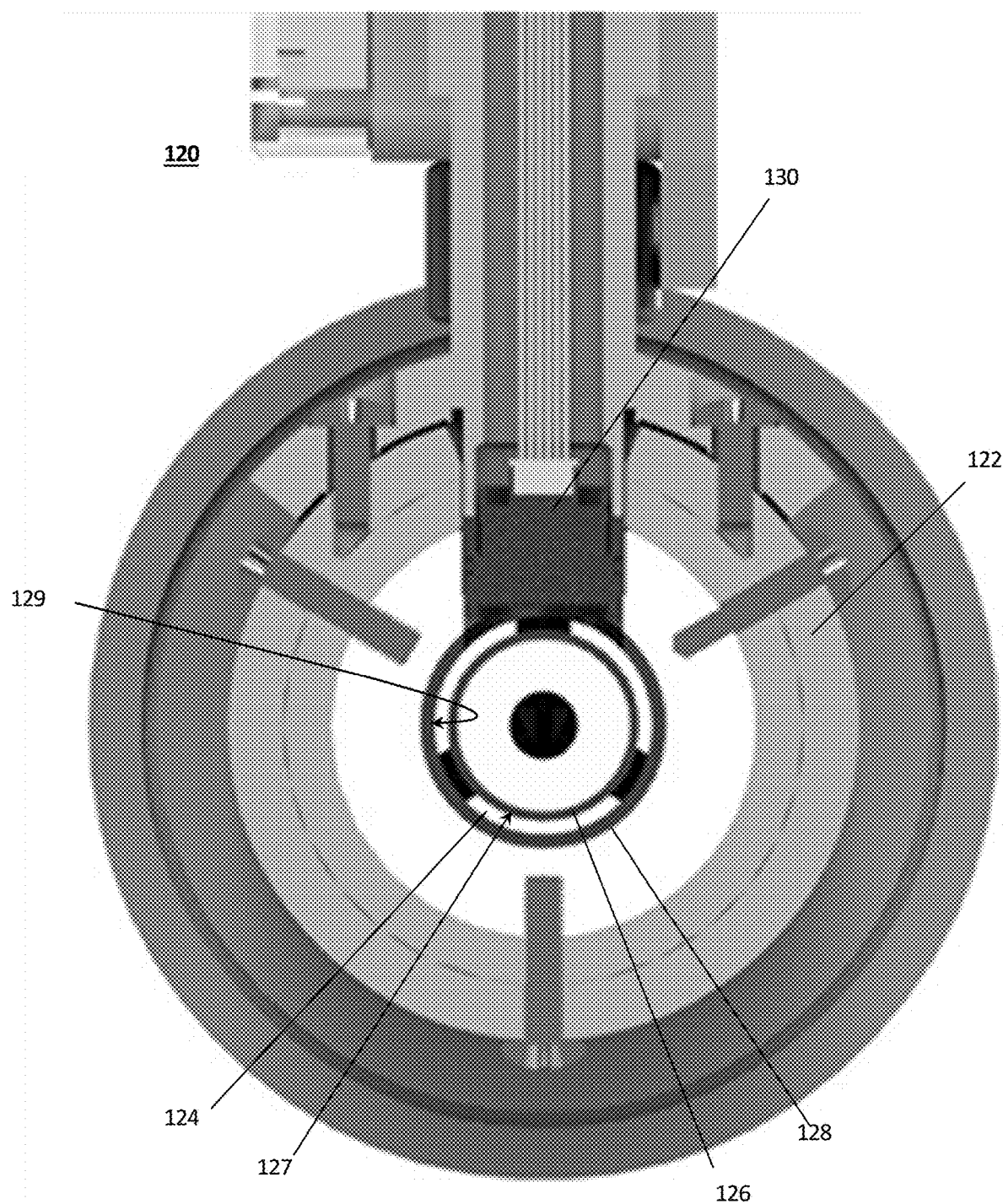
FIG. 2 is an end view of the cylindrical venturi components in accordance with the disclosed embodiments.
Figure 3:
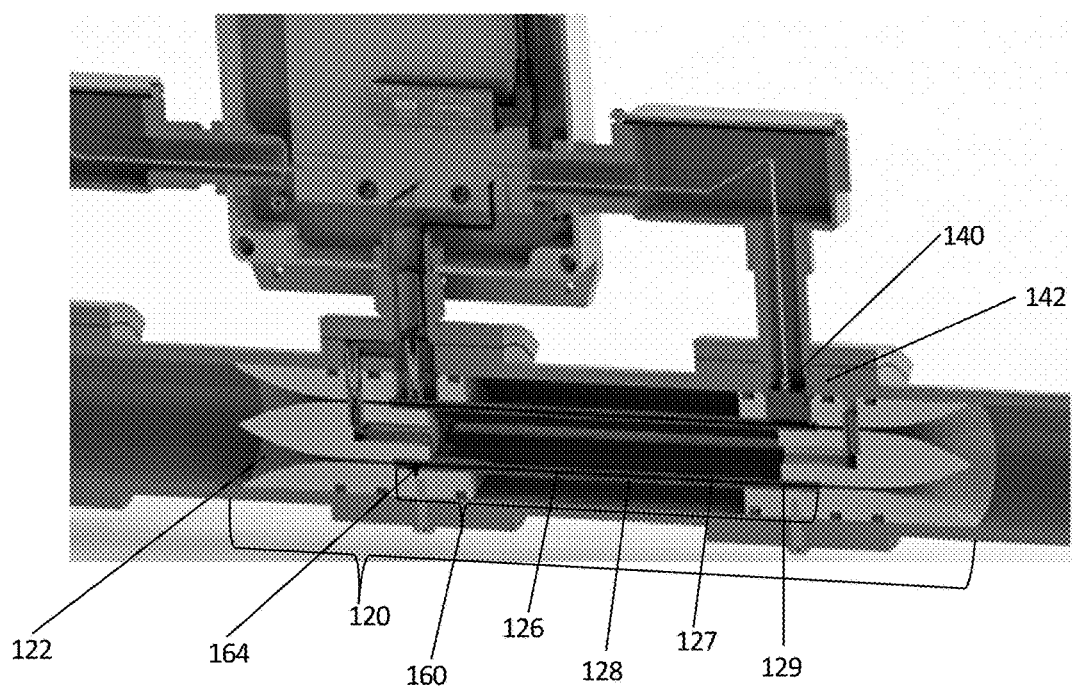
FIGS. 3 and 4 are perspective cross-sectional views of the embodiment of FIG. 1.
Figure 4:
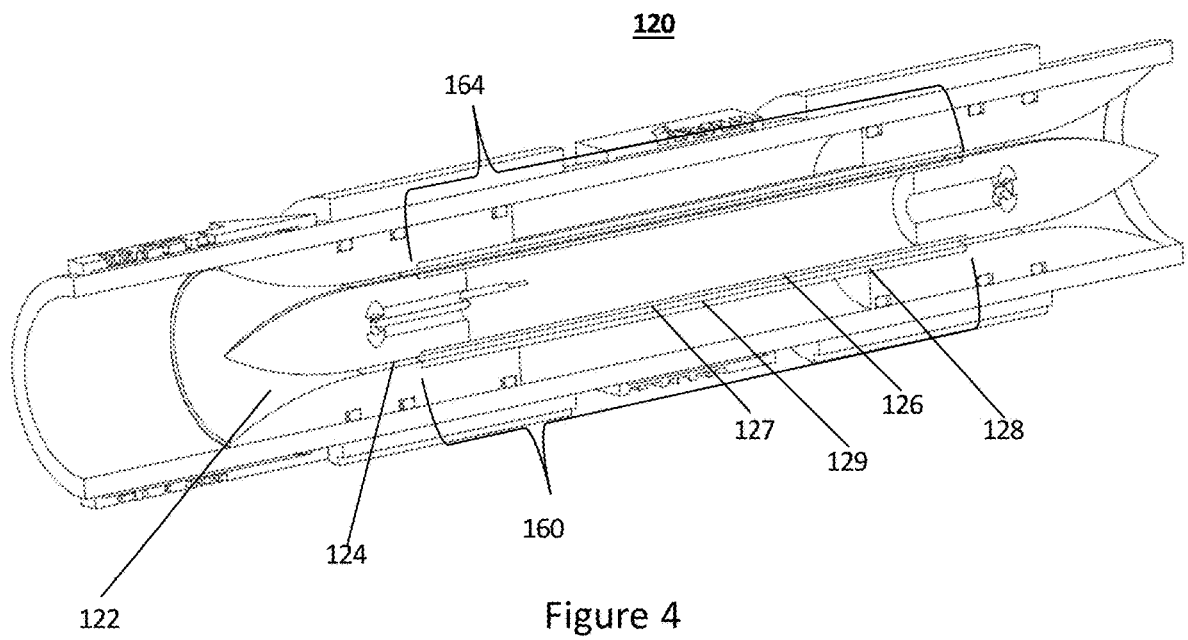

Referring to FIGS. 1-4, depicted therein are various views of a fluid sensor 110. In the illustrated example, fluid sensor 110 includes a cylindrical venturi 120, where the venturi causes pressurized fluid(s) pumped therethrough b take the form of a controlled thickness of non-stratified fluid as the fluid flows through the cylindrical venturi. The cylindrical venturi 120 reduces or eliminates stratification of the fluid flowing therethrough as a result of the combination of the cylindrical venturi region and the "necking" down of the incoming cylindrical fluid passage 122 into a thin region within the gap region 124 between the outer surface of the inner or first coaxially-aligned cylinder 126 and the outer or second coaxially-aligned cylinder 128. As illustrated in FIGS. 2, 3, and 4, the first coaxial cylinder 126 is located within, and along a common longitudinal axis of, the second coaxial cylinder 128 and a continuous gap 124 is formed between an outer surface 127 of the first cylinder 126 and an inner surface 129 of the second cylinder 128, the cylindrical venturi causing a controlled thickness of non-stratified fluid to flow therethrough.

Venturi 120 also includes a first fluid pressure sensor 130 located on inlet 132 to the venturi to measure a pressure for the pumped input fluid. A second fluid pressure sensor 140 is located on the outlet end 142 of the cylindrical venturi 120 to measure a pressure of the output fluid. It will be noted that one or both sensors 130 and 140 may also be suitable for sensing the temperature of the fluid passing thereby in order to provide fluid temperature data as well as pressure data.

In one embodiment, some parts of venturi 120 may be 3D printed from stereolithography-compatible resin or similar non-magnetic material. It is also contemplated that those venturi parts may be injection-molded, manufactured or machined using other well-known techniques. For durability, the venturi or other sensor components may be incorporated into a metal pipe or similar containment component (e.g., 152 in FIG. 1) and potted using a durable epoxy resin. The pressure sensors 130 and 140 are sensors that may be obtained from ES Systems, for example Model No. ESCP-MIS1. While a fluid sensor 110 made with polymeric components such as polyvinyl chloride (PVC), etc.) may be suitable for relatively limited (low) pressures in ranges of up to 50 psi or even 120 psi, it will be appreciated that the fluid sensor may also be designed for use in higher-pressure applications exceeding 120 psi. For example, with alternative materials and seals (e.g., thicker-walled steel or stainless steel components, high-pressure gaskets and seals, etc.), the disclosed sensor may be employed on pressurized wells and the like. In such an embodiment, use of a differential pressure probe(s) is contemplated to handle the increased range of pressures that the venturi sensor may experience.

Another aspect of the cylindrical venturi 120 is that it provides large surface area for the capacitive sensor 160 which is integral to the venturi 120. More specifically, the capacitive sensor includes a pair of coaxial or parallel conductive (e.g., metal) surfaces generally referenced as 164 in FIGS. 3-4 (e.g., made of copper, brass, etc., and with the inner surface area 129 of the outer cylinder of at least 21 sq. inches, the outer surface area 127 of the inner cylinder of at least 19 sq. inches, the thickness of the outer cylinder of at least 0.06 inches, and the thickness of the inner cylinder of at least 0.04 inches) operatively forming the cylindrical venturi. In one embodiment copper cylinders are employed for the conductive surface as it is easy to shape them to the appropriate size, and a conventional solder may be employed to attach electrical wire leads to the sensor cylinder surfaces 127 and 129. As noted above, alternative methods may be used to accomplish the conductive surfaces 127 and 129 on the coaxial cylinders. A capacitance measured between the conductive surfaces 127 and 129 on the coaxial cylinders is output as the dielectric properties of the fluid flowing through the venturi, where the capacitance allows for the characterization of the fluid in the gap 124—and in particular the ability to distinguish between the presence of water versus oil flowing through the sensor by the relative difference in dielectric properties. It will be further understood that the capacitance of the cylindrical venturi may be employed to sense the presence of impurities in any fluid flowing through it. As an example, because sensor 110 employing the cylindrical venturi 120 will measure dielectric values of the liquid going through it, it may be employed to measure water quality, such as water pumped or flowing from water wells or other sources. In one embodiment, a cylindrical venturi type sensor may be used as a component of an early detection system for contamination of a water supply.

Using the pressure differential measures as a difference between the outputs of the first pressure sensor 130 and the second pressure sensor 140, it is possible to determine a fluid flow rate as a result of both the size of the cylindrical venturi gap and/or calibration of the venturi itself. Accordingly, the fluid sensor 110 allows the device to determine a fluid flow rate as a function of the input fluid pressure from sensor 130 and output fluid pressure from sensor 140.

Figure 5:
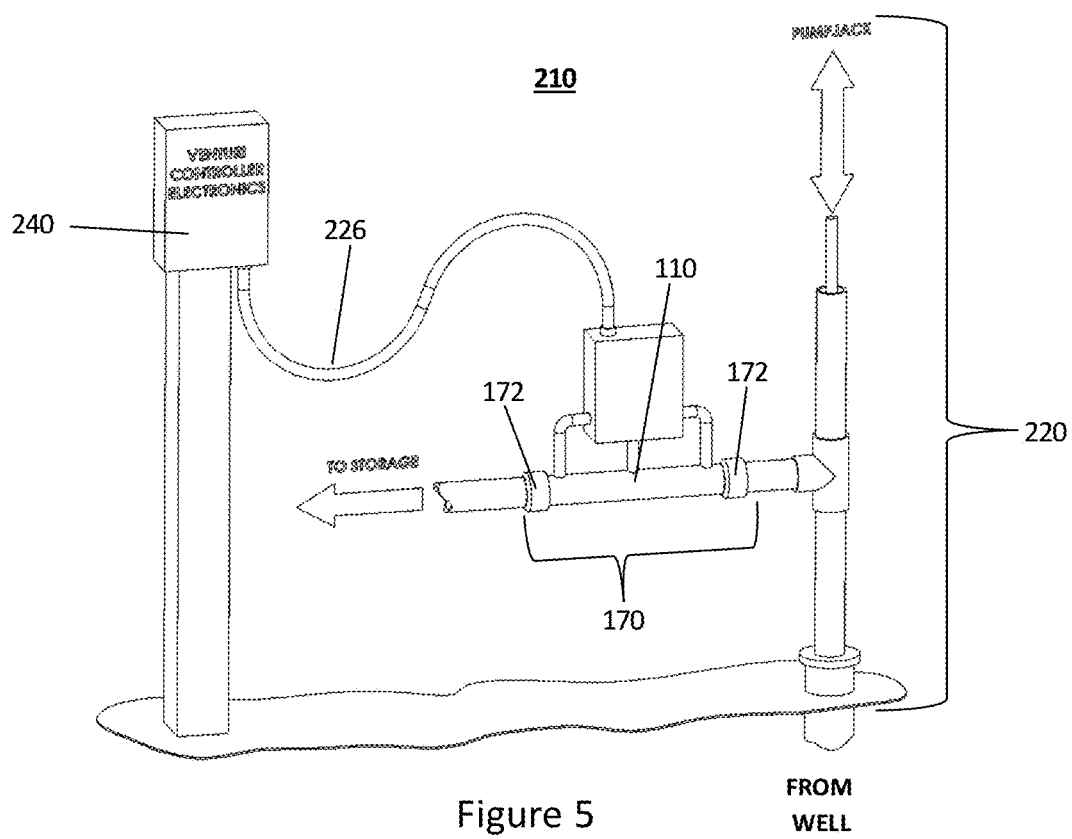
FIG. 5 is an illustrative example of a method of installing a venturi sensor to a pumpjack well system.

In one embodiment, such as that depicted in FIG. 1, the sensor 110 is contained within a housing 170, which is outfitted with standard threaded couplings 172 or similar on either end thereof to provide the sensor as a complete unit suitable for being plumbed or retrofitted in-line into a pumpjack well piping system such as depicted in the example of FIG. 5. Moreover, as a result of the depicted design, the venturi 120 and sensor 110 are completely self-draining after the pumpjack is shutdown, thereby avoiding fluid (e.g., water) collection and potential damage to the sensor due to freezing conditions, etc. As previously suggested, the use of a cylindrical venturi design, in combination with the necking-down of tie cylindrical pipe cross-section to an annular gap at the entrance to the venturi (see e.g., end view of gap region 124 in FIG. 2), avoids fluid stratification. Another characteristic of the disclosed cylindrical sensor embodiment is the maximization of the capacitive plate surface area while maintaining a compact sensor assembly.

Figure 6:
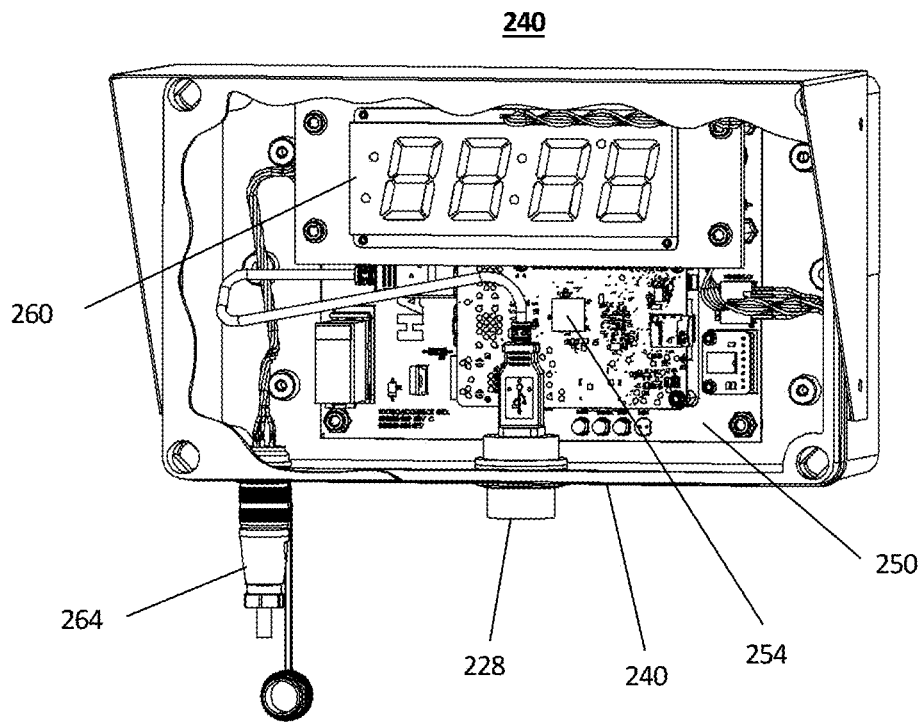
FIG. 6 is an illustrative example of control circuitry for incorporating the sensor into a pumpjack well system.

Having described the details of the fluid sensor 110, attention is also turned to FIGS. 5-11, which are provided to illustrate an embodiment of a pumpjack monitoring and control system, as well as the data collected from the system and processed. More specifically, a pumpjack monitoring and control system 210, such as depicted in FIGS. 5-6 may consist of or include an in-line fluid sensor 110 in a housing 170, where the sensor is operatively coupled or plumbed, for example via couplings 172, to receive the fluid output data of a pumpjack 220 connected to a wellhead. In the depicted configuration, sensor 110 is used to generate and output pressure and capacitance signals in response to the fluid output, the output signals being transmitted via wire or cable 226 to control and logging circuitry within the venturi electrical controller 240. The fluid sensor, as described above, includes a first fluid pressure sensor at the inlet to the venturi, a second fluid pressure sensor at an outlet of the venturi, and a capacitive sensor along the opposing walls of the cylindrical venturi, where the capacitive sensor includes a pair of conductive surfaces (e.g., coaxial cylinders) as part of the cylindrical venturi, operatively associated with the coaxial cylinders so the surfaces are opposed to one another and the flow of fluid in the venturi passes between the surfaces. While the conductive surfaces may be formed of metal pipes integral to the coaxial cylinder surfaces, they may also be in the form of conductive foils or other materials that are laminated to the cylinder surfaces using adhesives or other means of depositing a continuous conductive surface (e.g., vapor deposition, electro-chemical plating and the like).

The system 210 also consists of or comprises a controller 240, operating a micro-processor or similar microcontroller 254 in accordance with a set of pre-programmed instructions. The controller 240 includes a printed circuit board 250, that receives output from the fluid sensor 110 via USB cable 226 connected at port 228, and processes the output signals. In addition to data retrieval, connections to other devices may enable the exchange of information other than sensor data, including programmatic upgrades and the like. In one operating mode, the controller 240 (e.g., a single board computer available from Texas Instruments company) may operate simply as a data collection device, receiving and storing the sensor output signals in memory, including converting the signals from an analog output into a digital value for storage. Also included is a pin-type plug or port (e.g., 4-pin) 264, providing wired connectivity to the pumpjack (e.g., power and motor control signals). Wireless connectivity is also provided via a localized Bluetooth or Wi-Fi connection between the controller and a portable computing device (not shown), and also contemplated is a mobile telephony or satellite link that may be integrated into controller 240 to facilitate remote data exchange. Furthermore, a digital display 260 may be provided with controller 240, to provide status or operational information as well as real-time output of pressure or other data. Although not shown it will be appreciated that the system 210 further includes a power source, which may include one or more batteries for primary or backup power, and a real-time clock.

Figure 12:
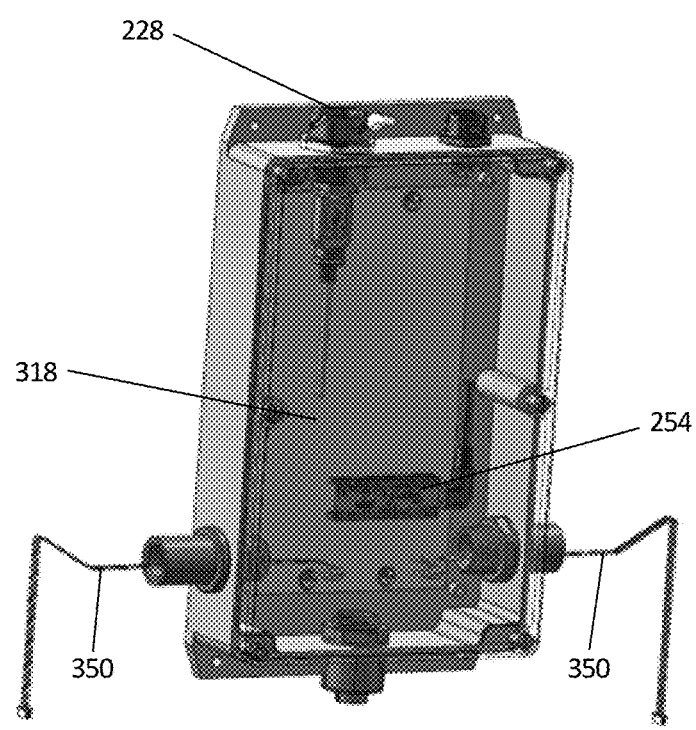
FIGS. 12 and 13 are illustrations of the sensor and signal conditioner circuitry for the embodiment of FIG. 1.
Figure 13:
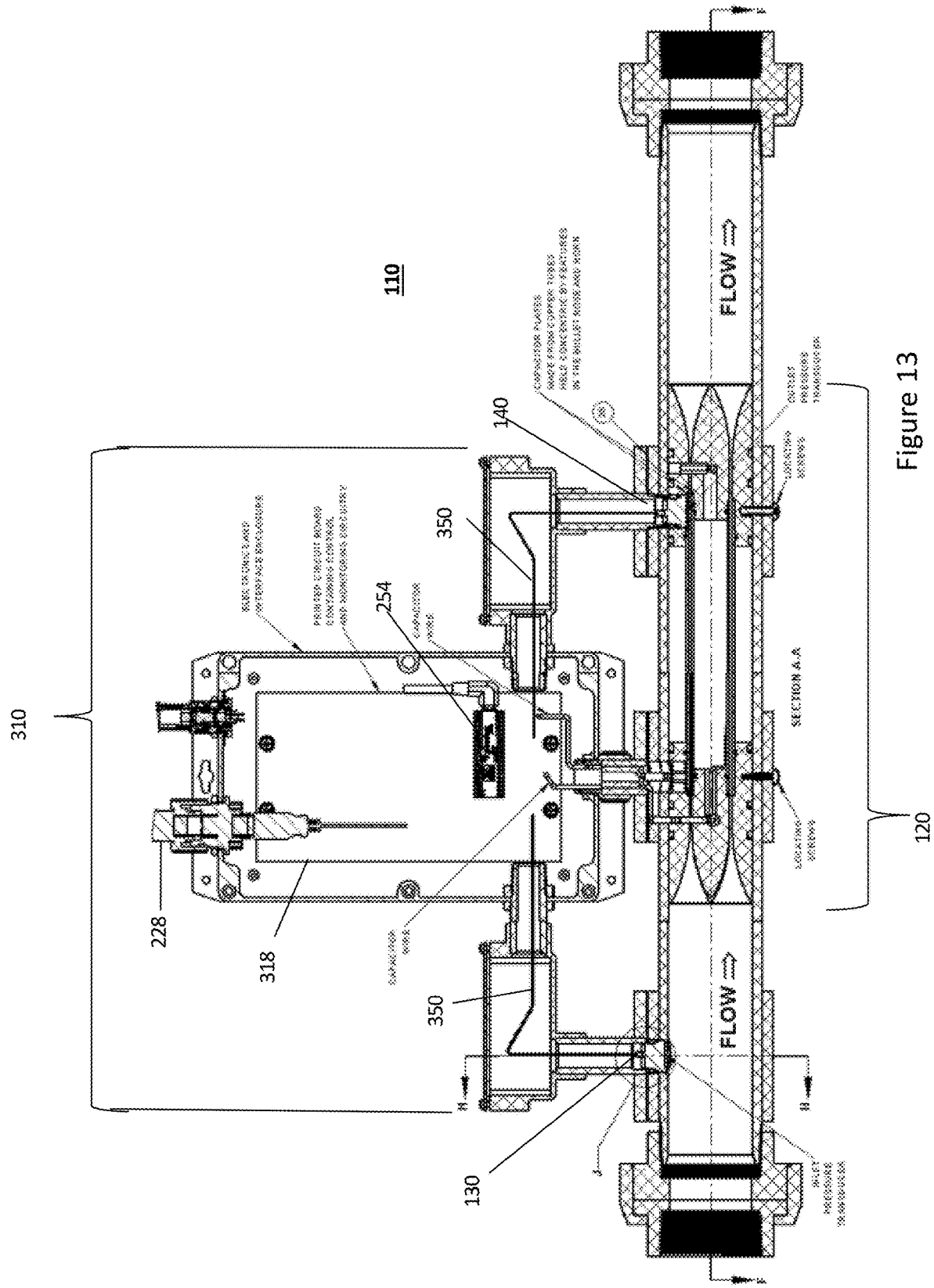

Referring briefly to FIGS. 12 and 13, in one embodiment the venturi sensor may include an embedded digital controller 254 with which it communicates with controller 240 via a digital UART signal (e.g., RS232). The venturi sensor system sends pre-digitized values for pressure, temperature, and capacitance to the controller. FIG. 13 is a representative illustration of the venturi system 120 with assembled electronics 310 attached. The electronics board 318 includes the microcontroller 254, which communicates with the pressure sensors 130, 140, measures capacitance, stores and ultimately transmits a digital stream of sensor data to the controller 240. The pressure sensors 130 and 140 are directly coupled to the electronics board 318 via wiring harnesses 350. The embedded digital controller 254 is employed to convert the analog sensor signals to digital signals to mitigate noise that is usually associated with a transmitted analog signal (especially when measuring capacitance). Lastly, the ability to sense temperature of the fluid flowing through the sensor allows for a more accurate characterization of the fluid pressures.

In another embodiment, the controller, or another computer processor (not shown) to which the controller 240 is linked (wired (e.g., port 264) or wirelessly), may use the output signals to monitor the pumpjack output and, based upon such signals, analyze and report the performance of the pumpjack as, for example, depicted in FIGS. 7-11. Moreover, the controller or other computer may process the output signals to totalize the amount of oil and/or water pumped from the wellhead over a period of time based upon the differential pressure data between the first and second pressure sensors and the capacitance data collected from the venturi 110. As noted above, the pumpjack monitoring and control system may include a wireless transceiver for communicating data with another computerized device.

The pumpjack monitoring and control system 210 may also process the data from the sensor 110 and modify the operation of the pumpjack to optimize extraction of oil from the wellhead. For example, the system may be employed to determine, based upon real-time output signals from sensor 110, whether oil, water or gas are being pumped and passed through the sensor. And, based upon such a determination, the pumpjack operation may be continued, stopped or otherwise adjusted accordingly. As an example, upon detecting the pumping of oil, the operation of the pumpjack is continued whereas upon the detection of water or gas the operation of the pumpjack may be stopped or modified. In one embodiment, the system determines or distinguishes the type of fluid in the sensor based upon the pressure and capacitance signals being generated by the sensor. For example, the system may employ one or more of the following rules:
 a) oil=high stroke pressure in combination with low capacitance;
 b) water=high stroke pressure in combination with high capacitance; and/or
 c) gas=low stroke pressure in combination with low/oscillating capacitance.

Figure 7:
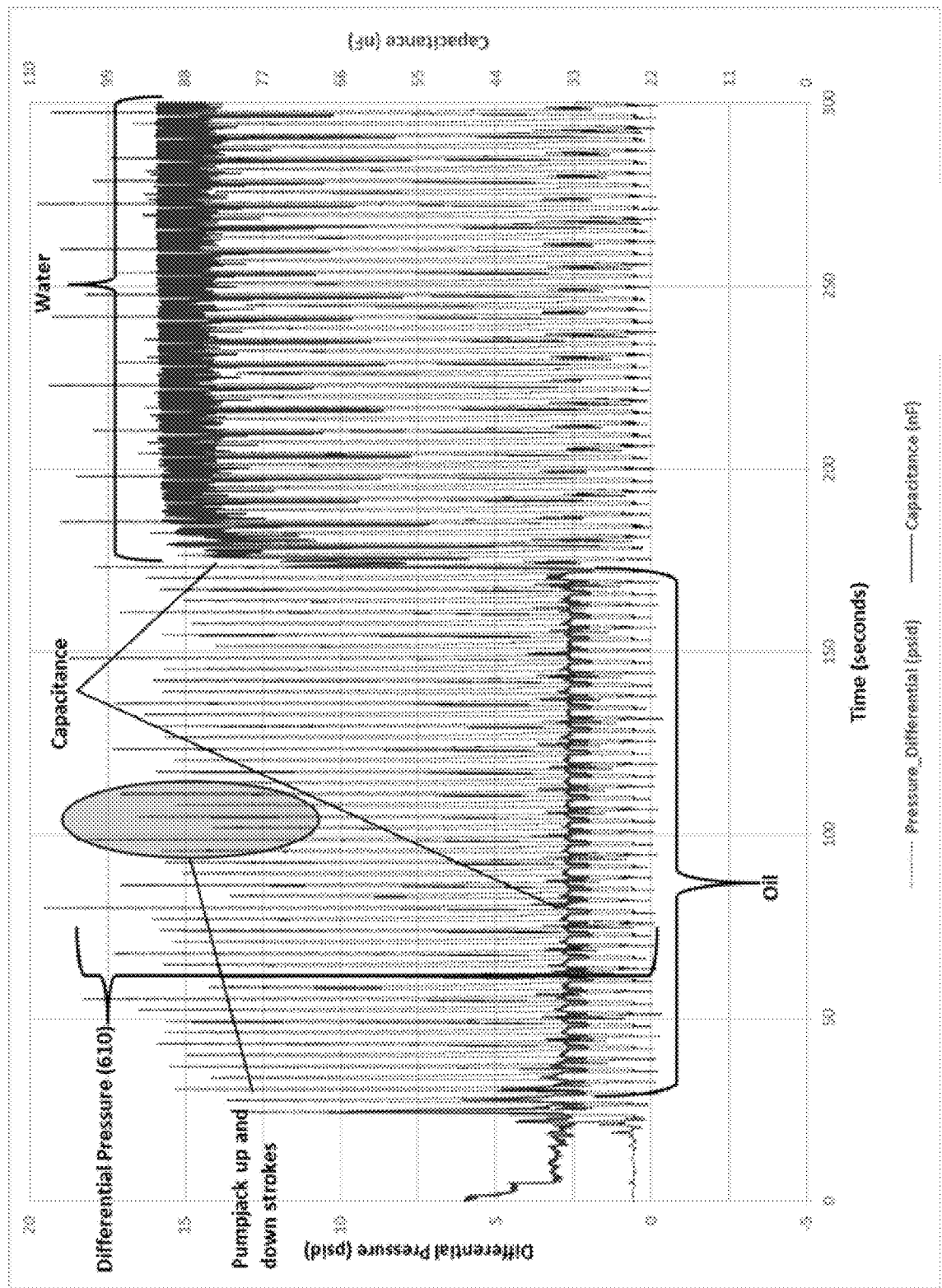
FIGS. 7-11 are illustrative graphs of exemplary pressure and capacitance data generated by a venturi sensor and associated control system.

As illustrated in FIG. 7, for example, each stroke of the pumpjack creates a pressure "spike" in the differential pressure (610) between the input and output sensors (130 and 140, respectively). And, when the fluid transitions from oil to water, at approximately 80 seconds in the chart of FIG. 7, the change in the pressure profile (slight decrease in peak pressure due to water) is concurrent with a similar increase in the measured capacitance (also consistent with water instead of oil being present in the cylindrical venturi).

Figure 8:
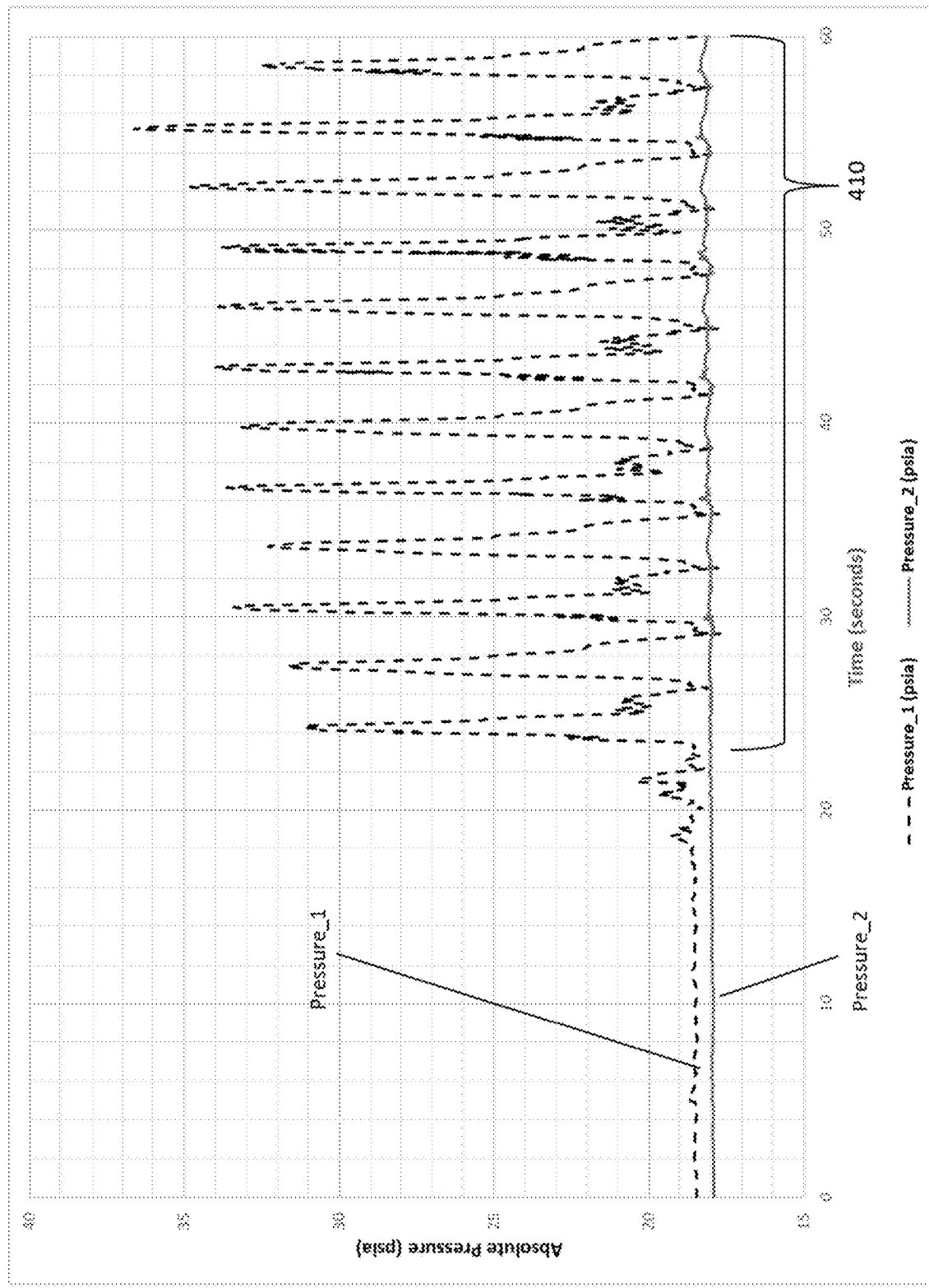
Figure 9:
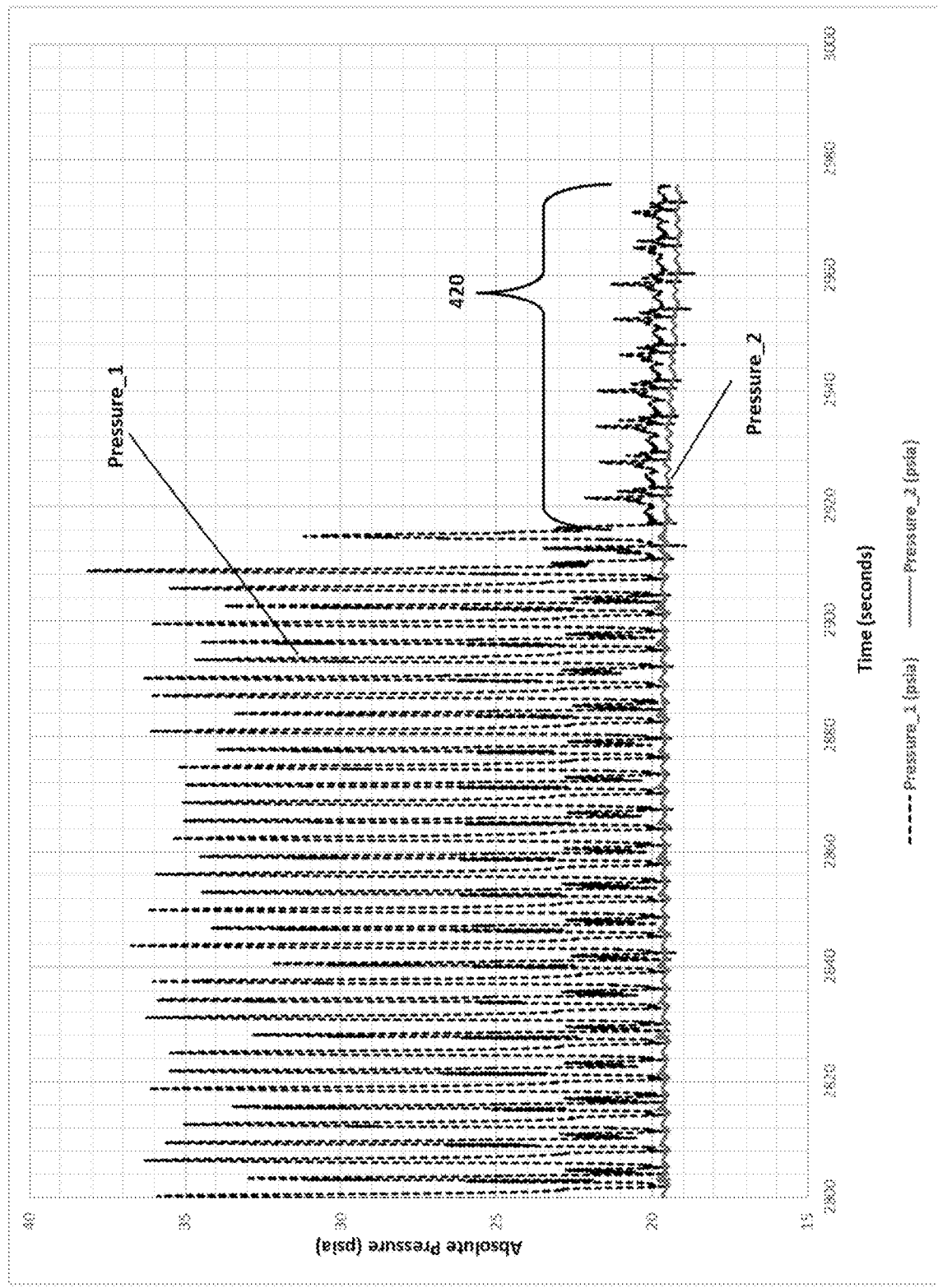

As illustrated in FIGS. 8-9, the observed differential (or absolute) pressure initially increases (e.g., pressure buildup region 410) above a nominal level when the pumpjack starts and begins to pump fluid through the sensor. And when the accumulated fluid in the well has been pumped off (e.g., well pumped-off region 420), the pressure decreases back to near the nominal pressure level as shown in FIG. 9. The controller 240 would then turn off the pumpjack via the power controller connector 264.

As will be further appreciated, in an embodiment where the controller 240 is employed with a sensor 110, the controller may perform operations based upon the presence and/or level of impurities detected in the fluid passing through the cylindrical venturi 120. As noted above, a possible application is the use of the controller and sensor combination to monitor a water supply or water flow. For example, upon detection of impurities, the controller could be programmed to modify operations including by stopping water flow, setting an alarm, and/or redirecting the flow for further treatment or processing.

Figure 10:
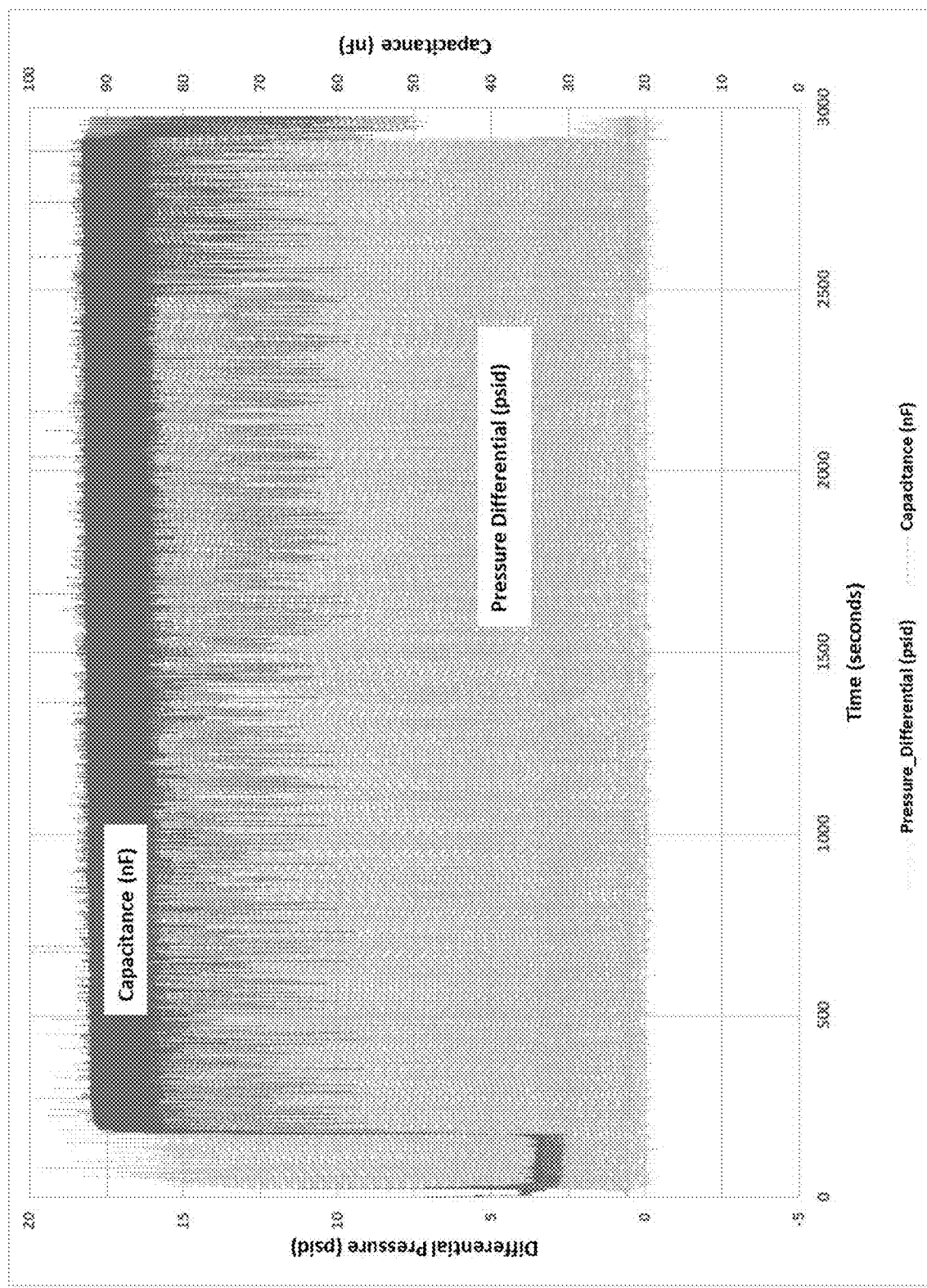
Figure 11:
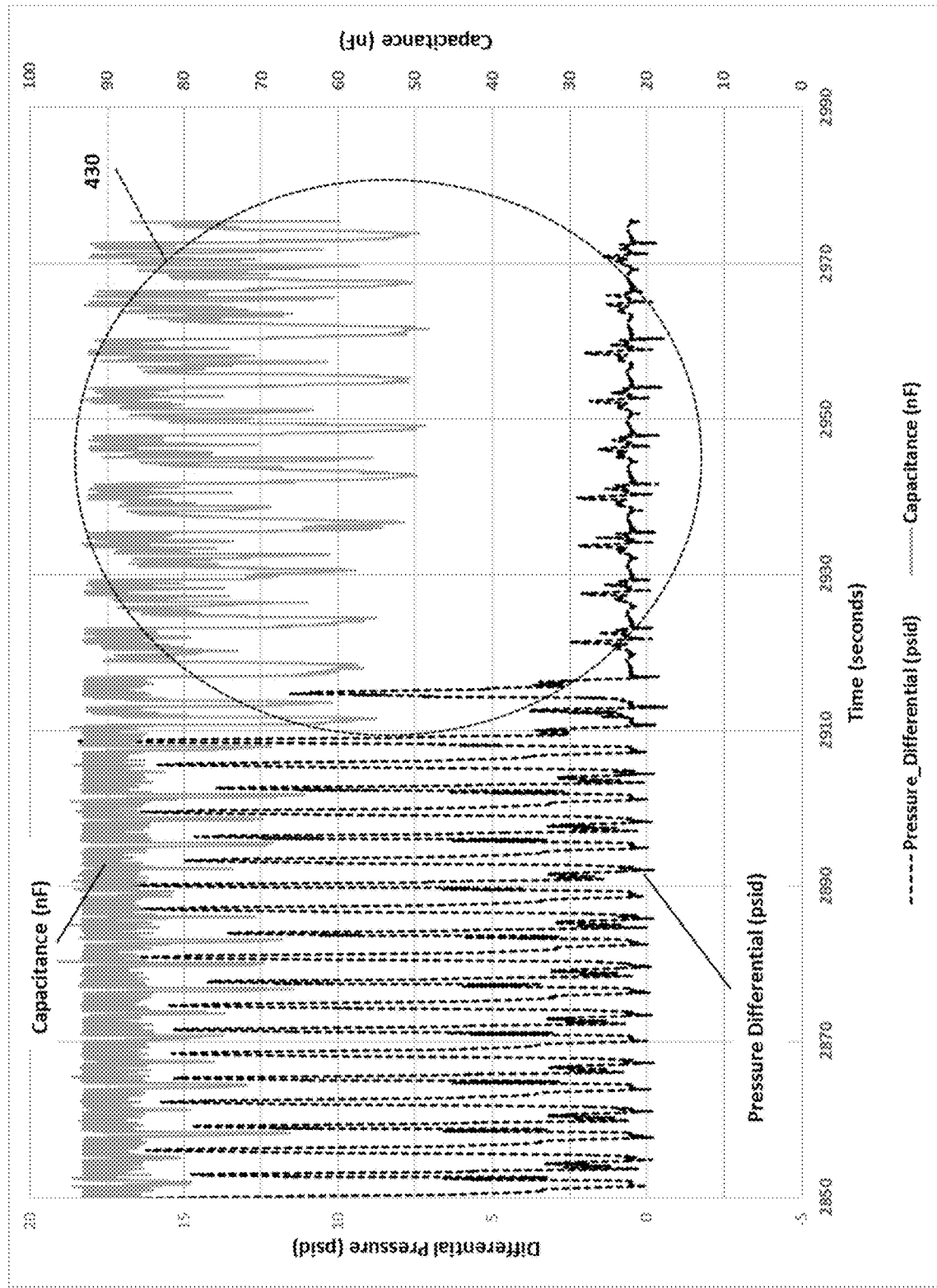

FIG. 10 is provided to illustrate how the controller records a time-series for the entire pumping cycle. Collection of the data allows for post processing to calculate the volume/water cut data, which can then be employed to facilitate greater accuracy of measurements and calculation of oil and water volumes. Whenever fluid is pumped from a well it is expected that the fluid may be a combination of oil and water. Typically, "water cut" is the ratio or percentage of oil/water that was pumped. For example, for the well tested (see e.g., FIG. 10), upwards of 95-percent of the fluid being pumped may be water. Thus, the water cut would be characterized as 95-percent. The availability and analysis of data collected across entire pumping cycles facilitates the use of "learning", including comparison against prior data and pattern detection within the data, to facilitate adjustment of control parameters based upon past performance data for the pumpjack/well. And, as suggested above and in FIG. 11, the data from the sensor might also be used to allow the system to detect the presence of gas or foam within the fluid pumped from the well and passed through the sensor. For example, region 430 of the graph shows a combination of low pressure plus low/oscillating capacitance that may indicate the presence of foaming or gas.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A fluid sensor comprising:
a cylindrical venturi including a pair of coaxial cylinders and having a gap between an outer surface of a first coaxial cylinder and an inner surface of a second coaxial cylinder, the cylindrical venturi producing a controlled thickness of non-stratified fluid flow through the gap;
a first fluid sensor located on an inlet to the cylindrical venturi to measure at least an input fluid pressure;
a second fluid sensor located just before an outlet of the cylindrical venturi to measure at least an output fluid pressure;
a capacitive sensor integral to the cylindrical venturi, the capacitive sensor including a pair of coaxial cylindrical metal surfaces, one located on the outer surface of the first coaxial cylinder and the other located on the inner surface of the second coaxial cylinder, for detecting the dielectric properties of the fluid flowing through the venturi.

2. The fluid sensor according to claim 1, wherein a fluid flow rate is determined as a function of the input fluid pressure and output fluid pressure.

3. The fluid sensor according to claim 1 where said sensor is a complete unit that is operatively coupled to a pumpjack well piping system.

4. The fluid sensor according to claim 3 where said fluid sensor is coupled to said piping system with standard plumbing fittings.

5. The fluid sensor according to claim 1, wherein fluid drains out of the sensor after the pumpjack is shutdown.

6. The fluid sensor according to claim 1, wherein at least one of said first and second fluid sensors also senses fluid temperature.

7. The fluid sensor according to claim 1, wherein said fluid sensor is operatively coupled to an output of a pumpjack connected to a wellhead, and generates at least pressure and capacitance signals in response to the fluid output by the pumpjack.

8. The fluid sensor according to claim 6, further including a controller, operating in accordance with a set of preprogrammed instructions, said controller processing the pressure and capacitance signals to monitor the performance of the pumpjack, including totalizing at least an amount of oil pumped from the wellhead.

9. A pumpjack monitoring and control system for a well, including:
an in-line fluid sensor, operatively coupled to receive the fluid output of a pumpjack connected to a wellhead of the well, and to generate at least pressure and capacitance signals in response to the fluid output, said fluid sensor comprising:
a) a cylindrical venturi including first and second coaxial cylinders, wherein the first coaxial cylinder is located within the second coaxial cylinder, said coaxial cylinders forming a continuous, consistent, and uniform gap between an outer surface of the first coaxial cylinder and an inner surface of the second coaxial cylinder, the cylindrical venturi causing a controlled thickness of non-stratified fluid flow through the gap;
b) a first fluid pressure sensor located on an inlet to the cylindrical venturi;
c) a second fluid pressure sensor located upstream of an outlet of the cylindrical venturi;
d) a capacitive sensor operatively associated with the cylindrical venturi, the capacitive sensor including a pair of conductive surfaces located on opposing sides of the gap in the cylindrical venturi; and
a controller, operating in accordance with a set of preprogrammed instructions, said controller receiving output from said fluid sensor, said controller processing the output and using said output to monitor the pumpjack output and to report the performance of the pumpjack, and totalize the amount and types of liquids pumped from the wellhead.

10. The pumpjack monitoring and control system according to claim 9, wherein the controller further characterizes, based upon the output of the capacitive sensor, an amount of oil and an amount of water pumped from the wellhead.

11. The pumpjack monitoring and control system according to claim 9, further including a wireless transceiver for communicating data with another computerized device.

12. The pumpjack monitoring and control system according to claim 11, wherein said controller further processes the data and modifies the operation of the pumpjack to optimize the extraction of oil from the wellhead.

13. The pumpjack monitoring and control system according to claim 12 wherein upon detecting the pumping of oil, the operation of the pumpjack is continued whereas upon the detection of water or gas the operation of the pumpjack may be modified.

14. The pumpjack monitoring and control system according to claim 9, where the system determines the type of fluid in the sensor in accordance with rules consisting of:
  a) oil=high stroke pressure in combination with low capacitance;
  b) water=high stroke pressure in combination with high capacitance; and
  c) gas=low stroke pressure in combination with low/oscillating capacitance.

15. The pumpjack monitoring and control system according to claim 14, where the system determines that the well has been pumped off based upon a decrease in pumpjack fluid pressure.

16. The pumpjack monitoring and control system according to claim 9, wherein the pair of conductive surfaces located on opposing sides of the gap includes a pair of concentric coaxial cylindrical metal surfaces, one metal surface located with on the respective outer surface of the first coaxial cylinder and the other metal surface located on the inner surface of the second coaxial cylinder, for detecting the dielectric properties of the fluid flowing through the venturi gap.

17. A fluid monitoring system, including:
an in-line fluid sensor, operatively coupled to receive the fluid output of a source of fluid, and to generate at least pressure and capacitance signals in response to the fluid output, said fluid sensor comprising:
  a) a cylindrical venturi including first and second coaxial cylinders, wherein the first coaxial cylinder is located within the second coaxial cylinder, said coaxial cylinders forming a continuous, consistent, and uniform gap between an outer surface of the first coaxial cylinder and an inner surface of the second coaxial cylinder, the cylindrical venturi causing a controlled thickness of non-stratified fluid flow through the gap;
  b) a first fluid pressure sensor located on an inlet to the cylindrical venturi;
  c) a second fluid pressure sensor located upstream of an outlet of the cylindrical venturi;
  d) a capacitive sensor operatively associated with the cylindrical venturi, the capacitive sensor including a pair of conductive surfaces located on opposing sides of the gap in the cylindrical venturi; and
a controller, operating in accordance with a set of pre-programmed instructions, said controller receiving output from said fluid sensor, said controller processing the fluid sensor output to monitor the fluid passing through said sensor and to identify the presence of impurities in the fluid.

18. The system according to claim 17, wherein the fluid monitored by the system is water.

* * * * *